United States Patent
Robb et al.

(10) Patent No.: US 7,034,488 B2
(45) Date of Patent: Apr. 25, 2006

(54) AUTOMATIC GATE OPERATOR

(75) Inventors: Eric Robb, Carol Stream, IL (US);
Richard Hill, Lake Zurich, IL (US);
William Gioia, Winfield, IL (US);
Edward Kukulski, Carol Stream, IL (US)

(73) Assignee: The Chamberlain Group, Inc., Elmhurst, IL (US)

( * ) Notice: Subject to any disclaimer, the term of this patent is extended or adjusted under 35 U.S.C. 154(b) by 0 days.

(21) Appl. No.: 10/989,123

(22) Filed: Nov. 15, 2004

(65) Prior Publication Data

US 2005/0073275 A1 Apr. 7, 2005

Related U.S. Application Data

(63) Continuation of application No. 10/368,134, filed on Feb. 18, 2003.

(51) Int. Cl.
*H02P 1/04* (2006.01)

(52) U.S. Cl. .................. 318/468; 318/16; 318/466; 318/266; 340/5.22

(58) Field of Classification Search .............. 318/16, 318/468, 466, 280, 283, 286, 282, 266; 340/5.25, 340/5.22, 5.26, 825.69, 825.72

See application file for complete search history.

(56) References Cited

U.S. PATENT DOCUMENTS

| | | | | | |
|---|---|---|---|---|---|
| 4,988,992 | A | * | 1/1991 | Heitschel et al. | 340/825.69 |
| 5,576,701 | A | * | 11/1996 | Heitschel et al. | 340/5.31 |
| 5,598,475 | A | * | 1/1997 | Soenen et al. | 713/168 |
| 5,600,324 | A | * | 2/1997 | Reed et al. | 341/176 |
| 5,751,224 | A | * | 5/1998 | Fitzgibbon | 340/825.72 |
| 6,025,785 | A | * | 2/2000 | Farris et al. | 340/5.23 |
| 6,081,203 | A | * | 6/2000 | Fitzgibbon | 340/825.72 |
| 6,154,544 | A | * | 11/2000 | Farris et al. | 380/262 |
| 6,166,650 | A | * | 12/2000 | Bruwer | 340/5.26 |
| 6,191,701 | B1 | * | 2/2001 | Bruwer | 340/5.22 |
| 6,414,587 | B1 | * | 7/2002 | Fitzgibbon | 340/5.22 |
| 6,690,796 | B1 | * | 2/2004 | Farris et al. | 380/239 |
| 6,856,237 | B1 | * | 2/2005 | Richmond et al. | 340/5.23 |
| 2002/0126037 | A1 | * | 9/2002 | Fitzgibbon | 341/176 |
| 2002/0137479 | A1 | * | 9/2002 | Tsui | 455/92 |
| 2002/0163440 | A1 | * | 11/2002 | Tsui | 340/825.69 |
| 2003/0227370 | A1 | * | 12/2003 | Brookbank et al. | 340/5.7 |
| 2005/0030153 | A1 | * | 2/2005 | Mullet et al. | 340/5.25 |

* cited by examiner

*Primary Examiner*—Paul Ip
(74) *Attorney, Agent, or Firm*—Fitch, Even, Tabin & Flannery

(57) ABSTRACT

A barrier movement operator is having a position sensor in a telescoping barrier control arm is described. A controller, remote from the arm, senses the barrier position to identify limits of barrier travel and to control rate of travel of the barrier between limits. The operator includes both optical and edge sensor obstruction detectors and is responsive to wireless communication for receiving user initiated command signals.

10 Claims, 4 Drawing Sheets

AUTOMATIC GATE OPERATOR

This is a continuation, of prior application Ser. No. 10/368,134, filed Feb. 18, 2003, which is hereby incorporated herein by reference in its entirety.

BACKGROUND

The present invention relates to automatic barrier movement operators.

Barrier movement systems are known in the art and generally comprise a motor for moving the barrier in response to a controller which determines necessary actions by responding to barrier travel limits, safety apparatus and user command input signals. With such known systems the travel limit determining apparatus is maintained at the controller and represents the controller's view of the barrier. Should the barrier be disconnected from the controller and moved, the barrier position may become unknown leading to lack of ability to automatically control the barrier.

Similarly, known systems may respond to a number of safety input devices, such as edge contact sensors or optical obstruction detectors, which is limited by the number of input ports provided for such. This is particularly so in commercial door operators or gate operators where the eventual equipping of the system depends on an unpredictable environment and the needs of the users and installers of such devices. Such a problem is quite complex for gate operators where the number of combinations of optical detectors and edge detectors is large and depends on factors unknown at the time the system is manufactured.

Known systems include the ability to optionally respond to wireless communications. Such systems typically require separate decoders for each wireless transmitter or type of transmitter resulting in undue complexity and cost. Also known systems typically start and stop barrier movement with a linear increase and decrease of power applied to a driving motor. Such systems do not pay continuing attention to barrier position and may result in efficient barrier movement or a barrier which moves too slowly or even stops before a destination limit of travel.

SUMMARY

The above disadvantages are overcome in accordance with the barrier movement operator described and claimed herein.

In accordance with one embodiment apparatus for generating position signals is disposed remotely from a controller of the apparatus and periodically reports position signals to the controller. Advantageously, the position sensor may comprise circuitry for producing an analog representation of position and an analog to digital convertor for periodically reporting digital position signals to the controller.

An embodiment also includes the ability to operate with an expanded number of safety devices such as edge contact detectors and optical obstruction detectors. Advantageously, the two types of safety devices produce non-interfering normal and safety signals so that different types of safety devices can be connected to the same input terminal. Upon receipt of a safety alerting signal the controller determines which type of device generated the signal and then performs a safety action associated with the signaling type of device.

The described and claimed barrier movement system also may respond to wireless user commands. Advantageously, the controller includes a single decoder which learns wireless input commands directed toward different operator functions such as movement of one barrier, movement of another barrier and movement of both barriers. The wireless commands are learned in a manner which can be used to duplicate the appropriate action when subsequent receptions of the same wireless command occur during an operate mode of the device. The fact that a received wireless command matches a previously learned command is reported to the controller on a separate communication path associated with the functions to be performed.

An improved method of setting limits of barrier travel is also described and claimed herein. Upon initiation of a limit learn function a barrier is moved to an end limit and a command signal is sent to the controller which responds by storing the end limit. The barrier is then moved to the other end limit, the position of which is stored by the controller in response to another command signal. The command signals may be produced by user inter action with a command button of the controller or by wireless transmissions.

Power is reduced to the barrier moving motor when a predetermined position of travel is reached with regard to an end limit. Such reduction of power is achieved by reducing the applied power in a non-linear function based on the actual position of the barrier as it slows. The non-linear reduction of power may be achieved, for example, by reducing power by a predetermined amount identified by barrier position. Non-Linear reduction may also be achieved by calculating the amount of power needed to reduce applied power to a predetermined minimum power. When power is being reduced it is possible that the barrier will move too slowly or stop altogether. Advantageously, the speed of barrier movement can be determined from recent position signals and, when too slow, power can be increased to provide a minimum rate of barrier travel.

DESCRIPTION

Figure 1:
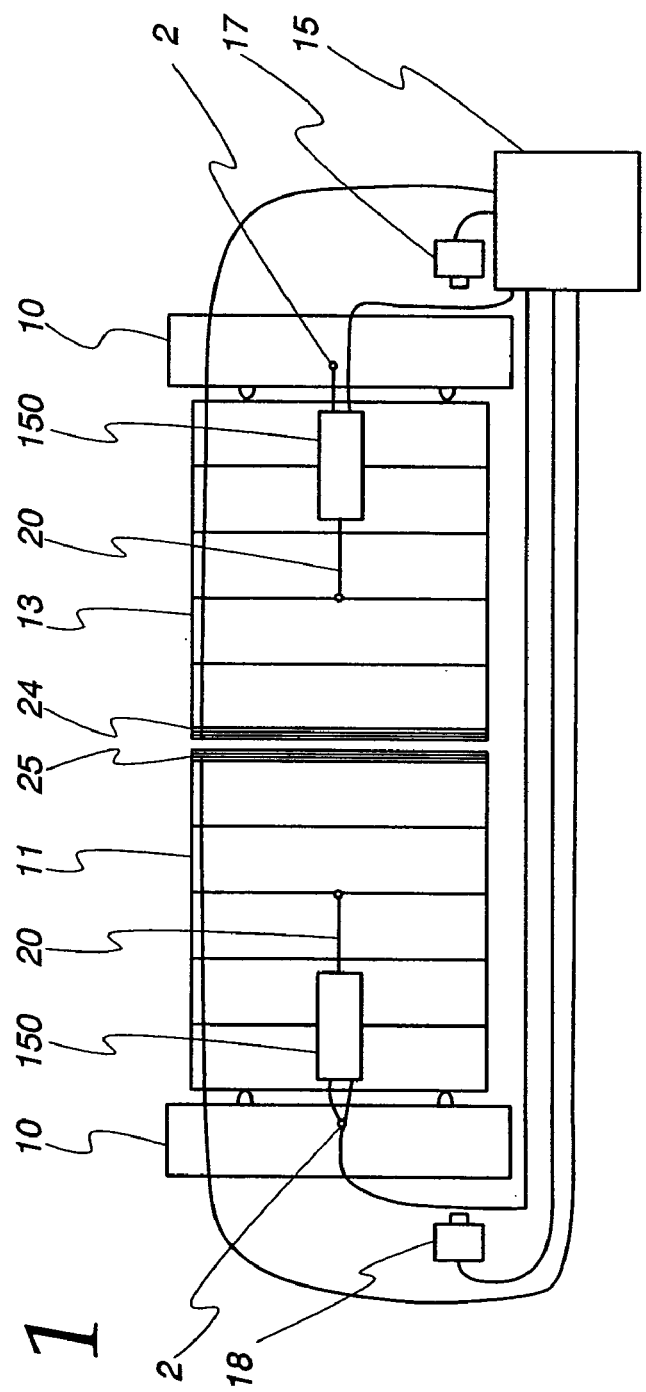
FIG. 1 is a combined schematic of an automatic gate operator.
Figure 6:
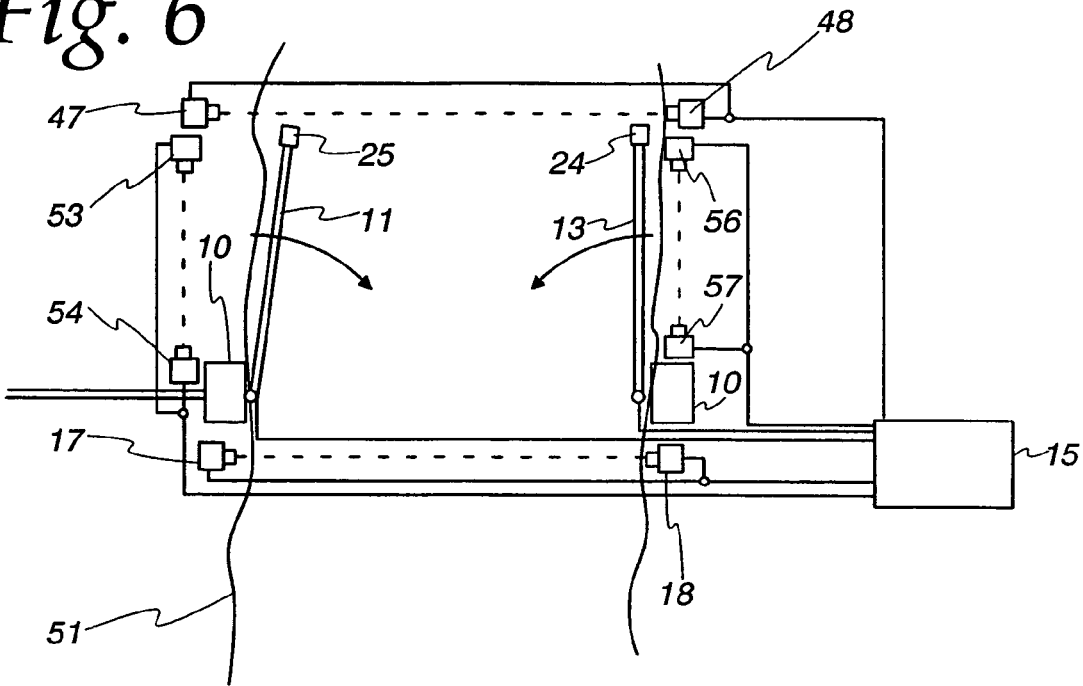
FIG. 6 is a combined block diagram and structural diagram of the safety equipment used in a gate operator.

FIG. 1 represents a barrier movement operator embodied as a gate opening and closing system. Although the embodiments and examples are written in terms of an automatic gate operator, it is to be understood that the principles discussed herein are equally applicable to other barrier operators such as garage door operators, solid door movers and window or shutter controllers. The gate operator system includes a pair of gates 11 and 13 each of which is mounted to swing from a respective post 10 mounted on either side of a passageway 51 (FIG. 6). A telescoping arm assembly 150 is connected between a post 10 and gate 11 and another telescoping arm assembly 150 is connected between the other post 10 and gate 13. The gates are individually moved by extending and retracting a portion 20 of the arm 150. The extension and retraction are controlled by signals from a control unit 15 which is in overall control of the barrier movement system. Control unit 15 responds to user commands to open and close the gates and also responds to feedback information from the telescoping arms 150 and information from photo eyes 17 and 18 and edge contact sensors 24 and 25.

Figure 2:
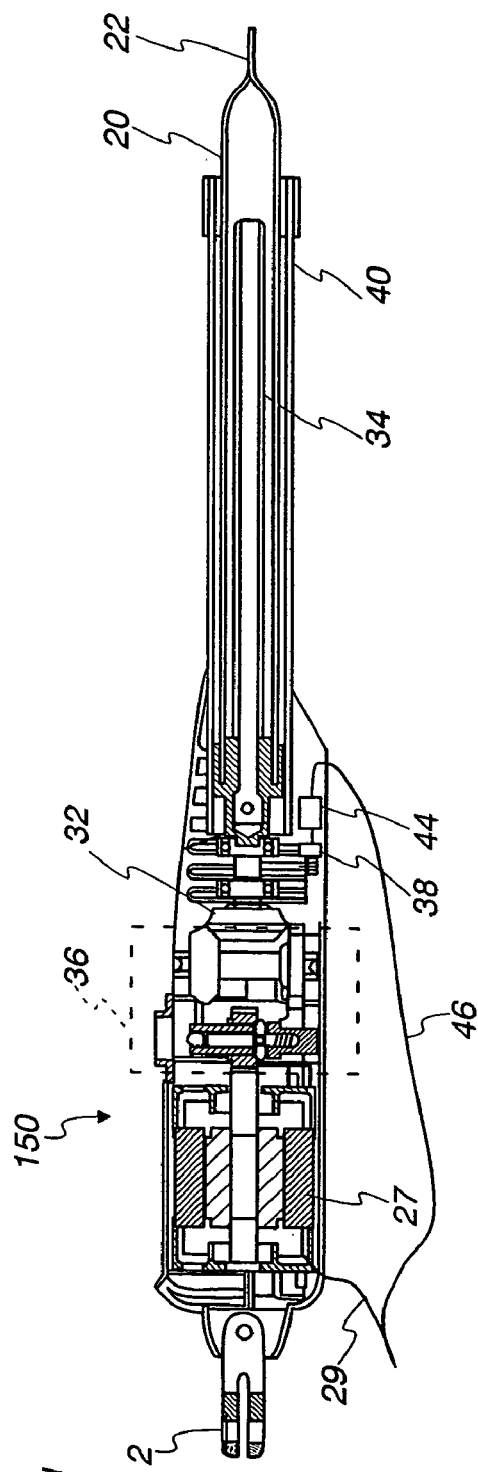
FIG. 2 is a cross-sectional view of a telescoping used to move the gates of FIG. 1.
Figure 3:
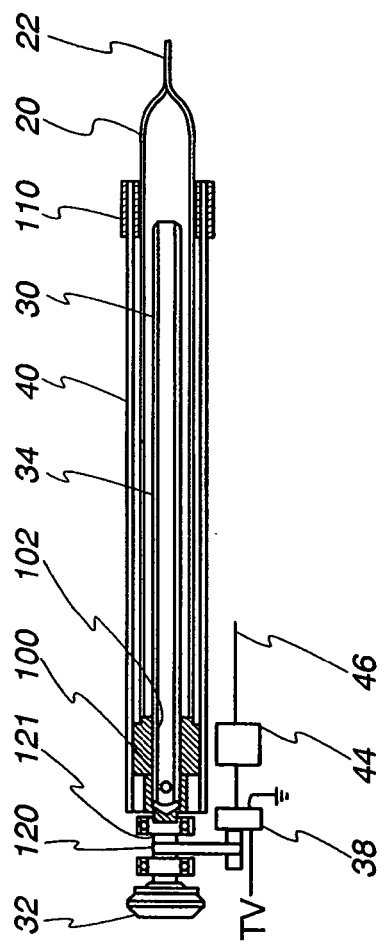
FIGS. 3 and 4 show portions of the telescoping arm in retracted position and extended position respectively.
Figure 4:
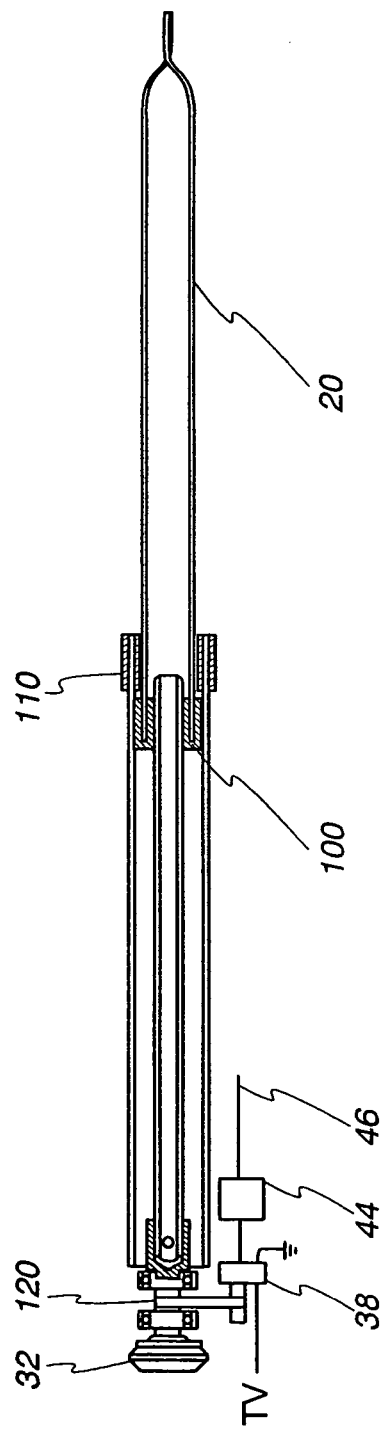

A more detailed representation of a telescoping arm is presented in FIG. 2. Telescoping arm 150 includes an electric motor 27 which rotates in response to electrical power provided from controller 15 via conduction path 29. In the disclosed embodiment motor 27 is a DC motor responding to pulse width modulated power however, it is to be understood that other types of electrical motors may be used when their rotation speed and/or output power can be controlled. The power output of motor 27 is connected by a rotation coupling 36 to a drive end 32 of a screw shaft extension. Coupling 36 provides gear reduction from motor 27 and permits a user to decouple the motor from drive 32. The make-up of coupling 36 is not described in detail herein. Drive end 32 is coupled by an extension 121 to rotate an elongated screw shaft 34.

Telescoping arm 150 comprises an outer tube 40 having therein an inner extension tube 20. A nut 102 having threads to mate with the threads of screw shaft 34 is disposed at an inner end of inner tube 20. Accordingly, when drive 32 is rotated, screw shaft 34 rotates and inner tube 20 is extended or retracted from and into outer tube 40 depending on the direction of rotation. The pitch of screw threads on shaft 34 is such that on the order of 8 or 9 revolutions of shaft 34 will fully extend or fully retract the inner tube 20. It should also be mentioned that when the motor 27 is decoupled from drive end 32, the inner tube 20 can be extended and retracted by pulling and pushing thereon. Such manual extension and retraction causes a rotation of screw shaft 34 in the same amount as occurs from motor 27, when coupled.

Figure 5:
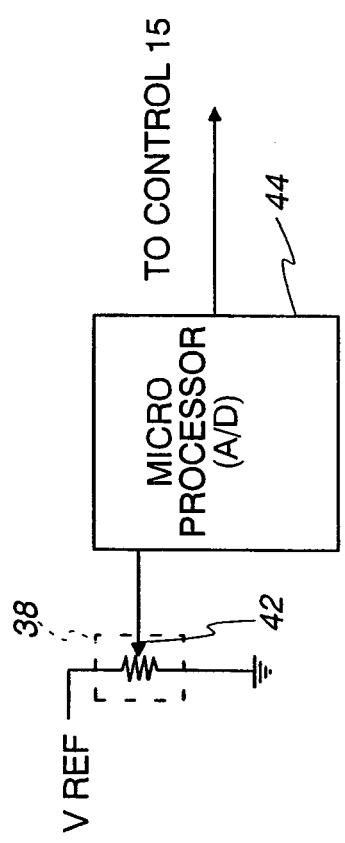
FIG. 5 is a schematic diagram of a position sensor signal generator.

Extension shaft 121 is coupled by means of a driving belt 120 to a 10 turn potentiometer 38. The relative diameters of shaft 121 and the control shaft of potentiometer 38 are such that a complete extension of inner tube 20 results in less than 10 rotations of the potentiometer shaft. Thus, the range of potentiometer is not exceeded during a full extension or retraction of the inner tube 20. The wiper 42 of potentiometer is connected as an input to an analog to digital converter 44 which is disposed within telescoping arm 150 along with the potentiometer 38. As shown in FIG. 5 the fixed ends of the potentiometer resistance are respectively connected to a reference voltage and to ground so that as the shaft 34 rotates, either by the action of motor 27 or manual action, a variable voltage is applied to the analog to digital convertor 44. In FIG. 5 analog to digital converter is represented as a microprocessor 44 which both produces digital representations of the analog position voltage and serially transmits those digital representations from the telescoping arm 150 to the controller 15. Microprocessor 44 is programmed to periodically transmit the digital position representing signals approximately every 50 m sec although other periods of transmission could be used.

FIG. 6 is a plan view of the barrier movement apparatus showing particularly the safety apparatus which may be associated with the gate. Posts 10 are disposed at either side of passageway 51. The gates 11 and 13 are attached to posts 10 to swing in an orientation which opens and closes access along the passageway. A plurality of photo eye pairs are disposed to form a frame around the area over which the gates swing. The pair of photo eyes 17–18 surveys a line across the passageway next to posts 10 while a pair of photo eyes 47–48 surveys the passageway just beyond the ends of the open gates. Each side of the passageway may also be protected by a pair of photo eyes. Photo eyes 53–54 survey one side of the passageway just outside the travel of gate 11 and photo eyes 56–57 survey a similar site on the gate 13 side. The photo eyes are electrically connected in pairs for communications with controller 15. An optical beam is normally transmitted from one photo eye e.g., 47 to another of the pair e.g., 48. When the optical beam is properly received the photo eye pair returns a predetermined voltage with periodic drops to zero volts to the controller 15. In an embodiment the drops to zero volts occur approximately every 7 m sec. When an obstruction breaks the optical beam the voltage remains at the predetermined voltage level without drops to zero volts and remains so until the obstruction is removed. Controller 15 is programmed to respond to a signal identifying an optically detected obstruction by stopping all movement of the gates until the obstruction is removed and proper signals are again received.

The edge contact obstruction sensors e.g., 24 and 25 are also connected to provide safety signals to controller 15. Edge sensors 24 and 25 are normally open contact switches the contacts of which have a predetermined edge sensor voltage applied between them. Normally the edge sensor voltage is detected by controller 15 indicating that no obstruction has been touched. Alternatively, when an obstruction is touched the normally open contacts are shorted and the voltage detected by the controller 15 drops to substantially zero and remains there until the edge sensor e.g., 24 is no longer touching an obstruction. Some edge sensors also include a known resistance connected between the sensor contacts at one end of the edge sensor. This permits the controller 15 to check for a constant current for assurances of a working sensor, but a signal of zero volts is still the safety signal. Thus, an edge safety signal comprises a drop of voltage sensed by controller 15 to substantially zero volts. Controller 15 is programmed to respond to an edge sensor safety signal by reversing the travel of all moving gates for a fixed distance.

Figure 8:
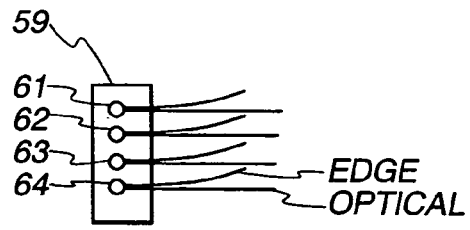
FIG. 8 is a schematic diagram of electrical connections to a set of input terminals.

The safety signals from edge sensors e.g., 24 and from photo eye pairs e.g., 47–48 are all applied to a set of input terminals 59 which are shown in greater detail in FIG. 8. Each input terminal 61–64 can be connected to one or more safety devices of either optical (photo eye) or edge contact type. When both optical and contact type sensors are connected to a terminal, that terminal will exhibit a predetermined voltage with near zero drops at an approximately a 7 m sec period when neither device has an obstruction. That is, the near zero drops by the optical sensor will pull the contact sensor voltage to zero for the time of the drops. Should the contact sensor strike an obstruction the voltage on the line will be pulled to a constant near zero. If instead the optical sensor is blocked by an obstruction the terminal will remain high which will be detected because the near zero drops on the input were present, but have gone away. Controller 15 periodically scans the input terminals 61–64 to determine that no safety signals are present. When a safety signal is detected, controller 15 identifies whether it is an optical safety device or a contact safety device which is creating the signal and takes appropriate action. That is, when the detected safety signal is from an edge contact sensor the direction of movement is reversed and when an optical safety signal is detected, gate movement is not started or stopped if motion is occurring. The input terminals 61–64 can be shared because the optical safety signal is a constant predetermined voltage while the edge contact safety signal is a constant near zero volt signal.

Figure 7:
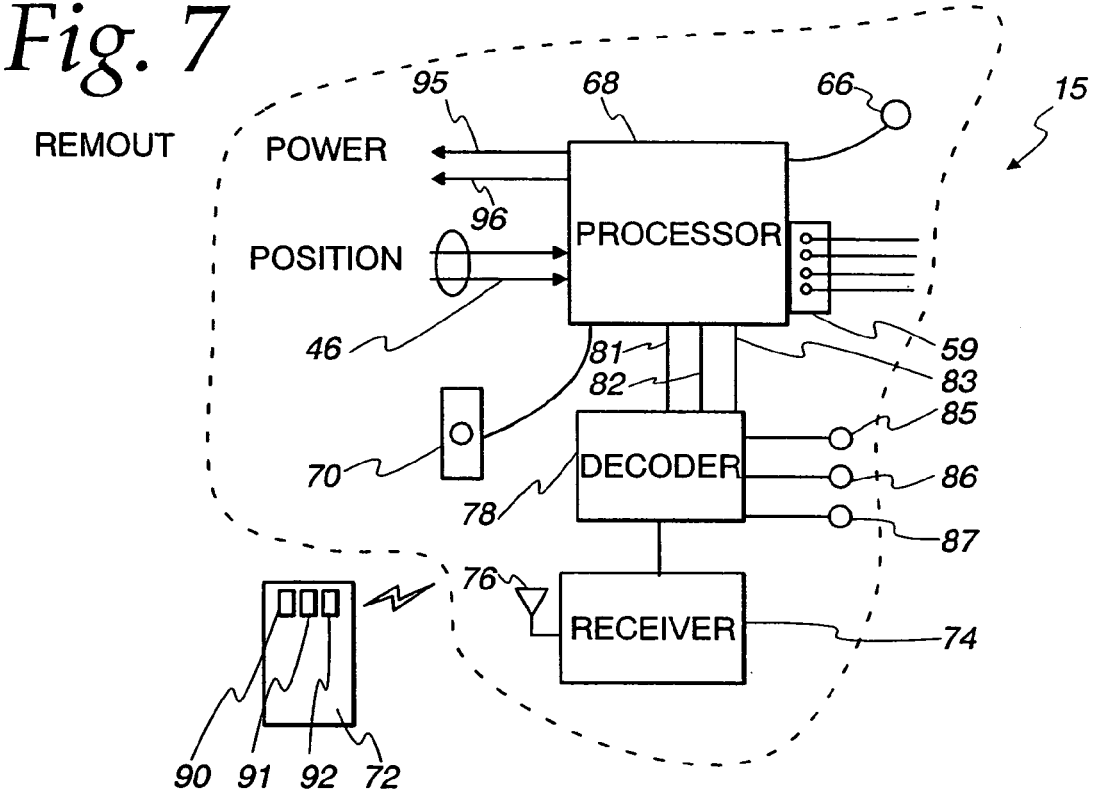
FIG. 7 is a block diagram of a controller for the gate operator.

During the set up of the gate operator the controller 15 is taught the end limits of travel of the gates. First, the user presses a limit learn button 66 (FIG. 7) to which processor 68 of controller 15 responds by entering the limit learn mode. The user then uncouples the motor 27 from the extension screw 34, if not already done, and manually moves a first gate to either the open or the closed position and signals such by pressing manual gate operator control button 70. Then the user manually moves the gate to the other limit position and again presses the control button 70. When, as shown in FIGS. 1 and 6, two gates are present the user repeats the process with the second gate. The controller 15 records in memory the digital representation of position from analog to digital controllers 44 at each open and closed limit for each gate. The gate can be controlled to move between the stored position limit values. It may be desirable for the controller to know which stored position limit corresponds to an open gate and a closed gate. In embodiments where such is desired the controller is programmed to expect the position limits for a predetermined state such as closed first. On the preceding limit setting process, limits were identified when a user pressed a control button 70. When the barrier movement system is equipped with wireless command capability (discussed below), wireless commands can also be used to identify limits in the same manner as button 70.

The barrier movement system of the present description may also include a wireless security code transmitter 72 which can wirelessly initiate movement of one or more of gates 11 and 13. Transmitter 72 transmits gate commands by RF signals, however, other types of wireless signaling such as optical or acoustic could be used. Controller 15 includes an RF receiver 74 which receives transmission from transmitter 72 via an antenna 76. Representations of received signals are sent to a decoder 78 which validates selected received signals and notifies processor 68 via one of a plurality of conductors of which conductor 81, 82 and 83. Validation of a received RF transmission is done on the basis of transmitted security codes and before validation can occur, the decoder 78 is taught values which are later compared to received security codes to complete validation or not.

Decoder 78 includes a microprocessor and memory which are programmed to operate in a learn mode and in an operate mode. Although different numbers of such buttons could be provided, decoder 78 is connected to three learn buttons 85, 86 and 87. In the present embodiment button 85 represents a learn mode for movement of gate 13, button 86 represents a learn mode for gate 11 and button 87 represents a learn mode for both gates.

Transmitter 72 includes three transmit buttons 90, 91 and 92, each of which is associated by transmitter 74 with a unique security code. When a transmit button e.g., 90 is pressed an RF transmission is sent which includes the security code unique to the pressed button. When a user wants to train the controller 15 to validate and respond to a wireless security code, such a security code must be stored by the decoder 78. When the user wants the security code to control gate 13, 11, or both, a button 85, 86 or 87 respectively is pressed to enter the learn mode for the correct gate or combination. The user then presses the button on transmitter 72 which is to perform the desired control. Upon pressing the appropriate transmitter button e.g., 90 the decoder 78, via receiver 74, receives a representation of the unique code associated with button 90 and stores it in a manner which identifies the gate or gates which are to respond to the newly stored code. After the received security code is stored in decoder 78, the decoder switches from the learn mode to the operate mode. Subsequent receipts of the code from transmitter 72 button 90 will cause decoder to send a command to processor 68 via a selected one of conductors 81, 82 or 83. The particular conductor 81, 82 or 83 selected, defines whether gate 11, 13 or both are to operate. Finally, when processor 68 receives a command on one of conductors 81, 82 or 83 the gate or gates associated with that conductor are controlled.

Figure 9:
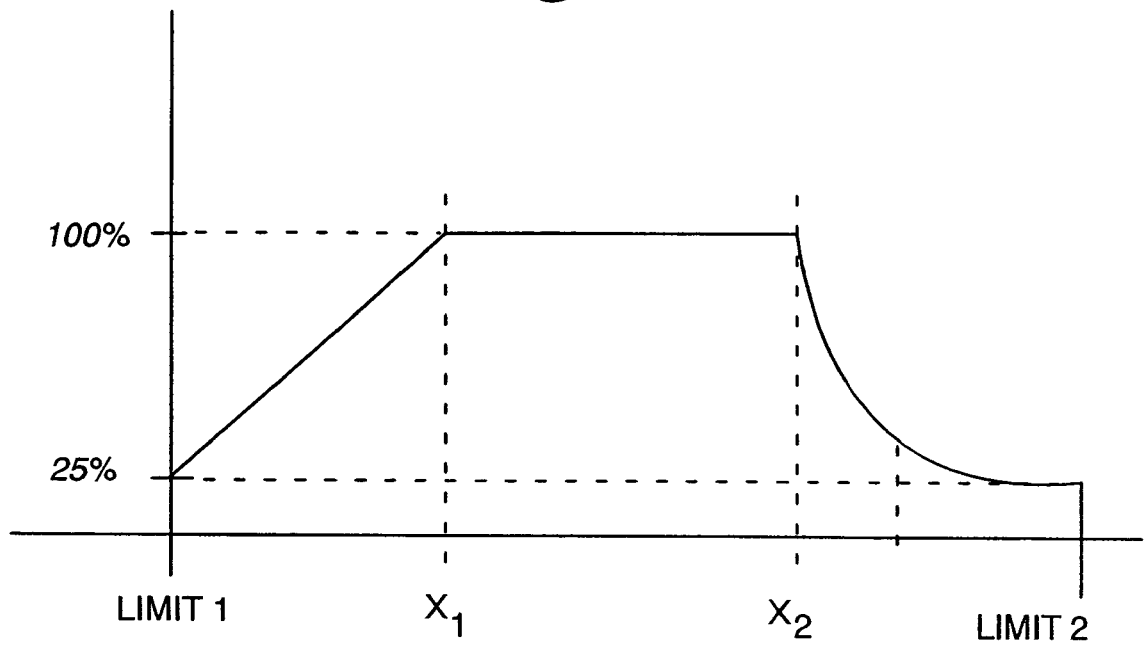
FIGS. 9 and 10 are representations of power applied to a motor to move the gate of the gate operator system.

Processor 68 of controller 15 responds to input signals from decoder 78, command button 70 and the safety input by starting, moving and stopping one or both gates. Such control is exercised by sending pulse width modulated DC to one or both of the motors 27 of telescoping arms 150. A gate is started from a first limit (limit1, FIG. 9) by applying approximately 25% of full power which is ramped upward to achieve 100% power at a predetermined point of gate travel $X_1$. The power level remains 100% until the gate achieves a second point $X_2$ at which the power is diminished until the 25% level is achieved at the destination end point. In the embodiment represented by FIG. 9 the power is not linearly ramped down in the reverse of the up ramp of start up power. Instead the power is non-linearly reduced to achieve a safe and efficient slowing and stopping the gate. Such non-linearly power reduction is achieved by reducing the power based on gate position as reported by the position sensing potentiometer 38 and analog to digital converter 44.

In a first embodiment after gate position $X_2$ is achieved the power may be reduced by a predetermined amount for each gate position reported from the telescoping arm 150. Such reductions are pre-established to achieve the non-linear reduction in power represented in FIG. 9. Alternatively, power may be reduced by calculating, for each reported gate position, the amount of power estimated to achieve 25% by the destination limit2. In either case, the non-linear reduction is achieved by reducing power based on door position.

Figure 10:
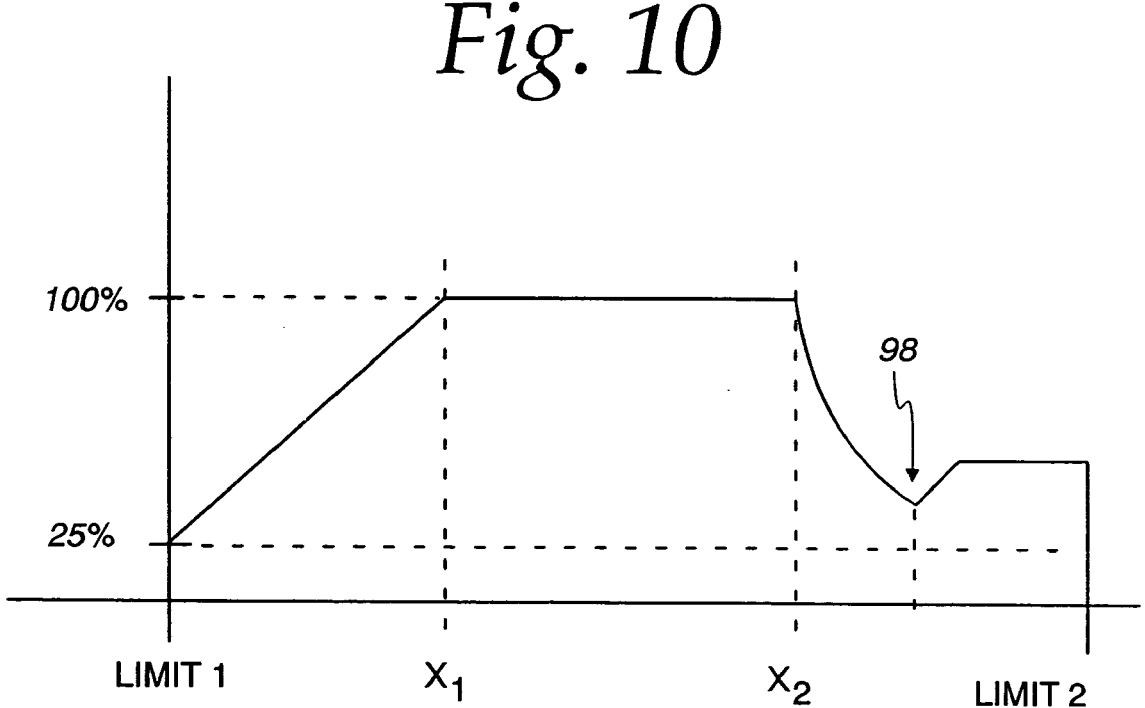

For reasons such as wear and tear on the gates as they age it is possible that the forces required to move the gate may be unpredictable. When the gate is speeding up or traveling at full power such required force will be overcome by the relatively high power levels. When power is being reduced it is possible that the unpredictable forces will cause the gate to move more slowly than desired or even stop. FIG. 10 represents an embodiment employed to overcome the slow or stopped gate situation. As before the non-linear power reduction begins when a position $X_2$ is indicated for the gate. As in FIG. 9 the power reduction is reduced based on gate position, however, the times and gate positions of recent reportings are also considered to estimate the speed at which the gate is moving. Such speed maybe, for example, determined from the last 5 position reports. When the speed falls below a predetermined amount given the current gate position, the power level is increased to achieve at least a predetermined rate. In one specific embodiment if the gate position is reported as the same (no movement) for the predetermined number of reports e.g., 5, the power is increased beginning at point 98 where no movement was detected. Such increase continues until the speed calculation indicates an adequate speed for safety and efficiency.

The invention claimed is:

1. Apparatus for remotely controlling movement of a plurality of barriers comprising:
 a source of a plurality of wireless signals each wireless signal including a security code;
 a decoder for learning security codes received during a learn mode comprising a selector, responsive to user interaction, for selectively initiating one of a first learn mode for learning a security code directed toward the movement of a predetermined one of the plurality of barriers and a second learn mode for learning a security code directed toward the movement of predetermined ones of the plurality of barriers;
 the decoder for receiving wireless signals during an operate mode for generating action signals identifying the one barrier or predetermined ones of the plurality of barriers in response to a received security codes; and
 a barrier movement controller for moving the barrier or barriers identified by the action signals.

2. The apparatus of claim 1 wherein the decoder comprises a memory for storing security code representations.

3. The apparatus of claim 2 wherein each stored security code representation is associated with the one of the plurality of barriers or the ones of the plurality of barriers.

4. The apparatus of claim 2 wherein the decoder comprises apparatus for comparing stored security code representations with the security code portions of received wireless signals.

5. The apparatus of claim 2 wherein the security code representations of wireless signals are stored in memory, during the first learn mode and during the second learn mode.

6. The apparatus of claim 1 wherein the source of wireless signals comprises a plurality of user actuatable devices each of which initiates the transmission of a wireless signal including a security code different from the other.

7. An apparatus according to claim 1 wherein the selector comprises a first switch responsive to user interaction to initiate a learn mode for the operation of the one of the plurality of barriers and a second switch responsive to user interaction to initiate a learn mode for the operation of the ones of the plurality of barriers.

8. An apparatus according to claim 1 wherein the decoder separately reports to the barrier movement controller a command to move the one barrier or a command to move the ones of the plurality of barriers.

9. An apparatus according to claim 8 wherein the decoder reports to the barrier movement controller on a first communication path to initiate the movement of the one barrier and on the second communication path to initiate the movement of the ones of the plurality of barriers.

10. An apparatus according to claim 1 wherein the decoder comprises a processor and a memory.

* * * * *